United States Patent [19]

Cohen et al.

[11] Patent Number: 5,202,101
[45] Date of Patent: Apr. 13, 1993

[54] REGENERATIVE PROCESS AND SYSTEM FOR THE SIMULTANEOUS REMOVAL OF PARTICULATES AND THE OXIDES OF SULFUR AND NITROGEN FROM A GAS STREAM

[75] Inventors: Mitchell R. Cohen, Troy, N.Y.; Eli Gal, Lititz, Pa.

[73] Assignee: General Electric Environmental Services, Lebanon, Pa.

[21] Appl. No.: 905,133

[22] Filed: Jun. 23, 1992

Related U.S. Application Data

[63] Continuation of Ser. No. 672,999, Mar. 21, 1991, abandoned.

[51] Int. Cl.$^5$ .............. B01J 8/00; C01B 17/00; C01B 21/00
[52] U.S. Cl. .............. 423/239; 423/244.05; 423/244.06
[58] Field of Search .............. 423/244 A, 244 R, 239, 423/239 A

[56] References Cited

U.S. PATENT DOCUMENTS

| | | | |
|---|---|---|---|
| R. 29,771 | 9/1978 | Cull et al. | 502/244 |
| 3,501,897 | 3/1970 | Van Helden et al. | 423/244 |
| 3,776,854 | 12/1973 | Dautzenberg et al. | 423/244 |
| 3,778,501 | 12/1973 | Lang et al. | 423/244 |
| 3,816,597 | 6/1974 | Smith | 423/244 |
| 3,832,445 | 8/1974 | Kouwenhoven et al. | 423/244 |
| 3,840,643 | 10/1974 | Martin | 423/244 |
| 3,846,536 | 11/1974 | Cull et al. | 423/244 |
| 3,966,879 | 6/1976 | Croenendaal et al. | 423/244 |
| 4,001,376 | 1/1977 | Cull et al. | 423/244 |
| 4,101,634 | 7/1978 | Ploeg | 423/239 |
| 4,164,546 | 8/1978 | Welty, Jr. et al. | 423/239 |
| 4,170,627 | 10/1979 | Ginger | 423/239 |
| 4,192,855 | 3/1980 | Ginger | 423/239 |
| 4,193,972 | 3/1980 | Pohlenz | 423/244 |
| 4,258,020 | 3/1981 | Ginger | 423/239 |

(List continued on next page.)

FOREIGN PATENT DOCUMENTS

| | | |
|---|---|---|
| 0268353 | 9/1987 | European Pat. Off. . |
| 1160662 | 8/1969 | United Kingdom . |
| 1438119 | 6/1976 | United Kingdom . |

OTHER PUBLICATIONS

Gal et al. "Coal Fueled Diesel Technology Development Emissions"; The Seventh Annual Coal Fueled Heat Engine and Gas Stream Clean-up, pp. 206–215– Mar. 1990.

(List continued on next page.)

*Primary Examiner*—Gregory A. Heller
*Attorney, Agent, or Firm*—Nixon & Vanderhye

[57] ABSTRACT

A process and system for simultaneously removing from a gaseous mixture, sulfur oxides by means of a solid sulfur oxide acceptor on a porous carrier, nitrogen oxides by means of ammonia gas and particulate matter by means of filtration and for the regeneration of loaded solid sulfur oxide acceptor. Finely-divided solid sulfur oxide acceptor is entrained in a gaseous mixture to deplete sulfur oxides from the gaseous mixture, the finely-divided solid sulfur oxide acceptor being dispersed on a porous carrier material having a particle size up to about 200 microns. In the process, the gaseous mixture is optionally pre-filtered to remove particulate matter and thereafter finely-divided solid sulfur oxide acceptor is injected into the gaseous mixture to form an entrained bed. Ammonia gas is also injected into the exhaust gas stream. A filter separates spent solid sorbent and particulate matter from clean gas. A classifier is used to separate mixtures of spent sorbent from particulate matter. A regenerator receives spent sorbents for regeneration and means are provided for passing regenerated finely-divided solid sorbent from the regenerator to the entrained bed reactor. A preferred sorbent is copper oxide on porous alumina carrier.

10 Claims, 3 Drawing Sheets

U.S. PATENT DOCUMENTS

| | | |
|---|---|---|
| 4,587,113 | 5/1986 | Joubert .................................. 423/239 |
| 4,609,537 | 9/1986 | Tolpin et al. ........................ 423/244 |
| 4,640,825 | 2/1987 | Rosenberg ............................ 423/235 |
| 4,670,237 | 6/1987 | Graf et al. ............................ 423/239 |
| 4,692,318 | 9/1987 | Tolpin et al. ........................ 423/239 |
| 4,744,967 | 5/1988 | Brand et al. ........................ 423/239 |
| 4,851,202 | 7/1989 | Fennemann .......................... 423/239 |
| 4,871,522 | 10/1989 | Doyle .................................... 423/239 |
| 4,915,920 | 4/1990 | Kobayashi ............................ 423/239 |
| 4,917,875 | 4/1990 | Moore et al. ........................ 423/244 |

OTHER PUBLICATIONS

Baxter et al., "Interaction of $SO_2$ With Copper and Copper Oxide Surfaces"; J. Vac., Sci. Technol. A., vol. 6, No. 3, May/Jun. 1988.

Pollack et al., "Properties of Copper/Alumina Sorbents Used for the Removal of Sulfur Dioxide"; Ind. Eng. Chem. Res.(1988), 27, 2276–2282.

McArdle et al., (Jul. 1987) "Sorbent Life Cycle Testing Fluidized-Bed Copper Oxide Process"; Third Annual Coal Utilization and Environ. Control; pp. 1–12; Table 1 & Table 2; FIG. 1–FIG. 9.

Yeh et al., "Process Simulation of the Fluidized-Bed Copper Oxide Process Sulfation Reaction"; Environmental Progress (vol. 6, No. 1) pp. 44–50, Feb. (1987).

Shilling, "In-Duct Application of Dry Flue Gas Desulfurization"; General Electric Environmental Services, Inc.-pp. 1–5, Second Annual Pittsburgh Coal Conference, Sep. 16–20, (1985).

McCrea et al.; "Evaluation of Solid Absorbents for Sulfur Oxides Removal From Stack Gases"; Proceedings of the Second Int'l Clean Air Congress, pp. 922–930 (1971).

Van Helden et al.; Chem. Abstracts, vol. 71, 93322k (1969) "Removal of Sulfur Dioxide from an Oxygen-Containing Gas."

Strakey et al.; "Removal of $SO_2$ and $NO_x$ from Flue Gas In A Fluidized-Bed Copper Oxide Process"; pp. 196–203 from Pittsburgh Energy Technology Center, U.S. Dept. of Energy (UNDATED).

Demski et al., "Simultaneous Removal of $SO_2$ and $NO_x$ from Flue Gas Employing A Fluidized-Bed Copper Oxide Process"; pp. 1–20; FIG. 2–7 (UNDATED).

REGENERATIVE PROCESS AND SYSTEM FOR THE SIMULTANEOUS REMOVAL OF PARTICULATES AND THE OXIDES OF SULFUR AND NITROGEN FROM A GAS STREAM

The government of the United States of America has rights in this invention pursuant to Contract No. DE-AC21-88MC 23174 awarded by the U.S. Department of Energy.

This is a continuation of application Ser. No. 07/672,999, filed Mar. 21, 1991, now abandoned.

BACKGROUND OF THE INVENTION

This invention relates to a process and system for reducing the concentration of pollutants contained in a gaseous mixture, and more particularly, to a process and system for the removal of particulate matter and the oxides of nitrogen and sulfur from a gaseous mixture, as well as the regeneration and recycling of spent sorbent used to remove the oxides of sulfur from the gaseous mixture.

Particulate matter and the oxides of sulfur and nitrogen result from the combustion or air oxidation of carbon-containing materials, such as coal, fuel oil and the like, and are responsible for major amounts of pollution in our environment. Currently, the commercially available processes and systems for the removal of oxides of sulfur and nitrogen and particulate matter from combustion gases resulting from the combustion or air oxidation of coal or fuel oil in power plants are generally very expensive to build and to operate. The removal of each contaminant requires a large scale system and produces large quantities of waste.

A large number of processes and systems have also been proposed in the literature, including the processes and systems discussed in U.S. Pat. Nos. 3,501,897; 3,776,854; 3,816,597; 3,840,643; 3,966,879; 4,101,634; 4,164,546; 4,170,627; 4,192,855; 4,193,972; 4,258,020; 4,609,537; 4,692,318; 4,744,967 and 4,851,202, all of which are incorporated herein by reference in their entirety. In the foregoing references, either $SO_2$ is removed; or $NO_x$ is removed; or $SO_2$ and $NO_x$ as well as particulate matter are removed from combustion gases, usually by using solid sulfur oxide acceptors and/or ammonia gas. In certain instances, it is also known to regenerate the spent or loaded sulfur oxide acceptor by various means as described in U.S. Pat. Nos. 3,501,897; 3,776,854; 3,778,501; 3,846,536; 4,001,376; 4,101,634; 4,164,546; 4,192,855; 4,609,537 and 4,692,318, all of which are incorporated by reference herein in their entirety. In many of the references, the solid sulfur oxide acceptor is used in the form of a moving bed, a fluidized bed, a fixed bed or in a "parallel passage" reactor, and both the removal of sulfur oxides with solid sulfur oxide acceptor and the regeneration of the spent or loaded solid sulfur oxide acceptor are inefficient, inadequate and/or expensive.

In most instances in the prior art, copper, copper oxide or a mixture thereof is coated on alumina or impregnated in alumina to form solid sorbents for the removal of sulfur dioxide from gases. In U.S. Pat. No. 3,966,879, sulfur oxides and particulate matter are removed from waste gases in the same processing zone under the reaction conditions required for sulfur oxide acceptance in a moving bed which contacts the waste gas stream in cross-current fashion.

The reduction of the nitrogen oxides ($NO_x$), both NO and $NO_2$, to free nitrogen with ammonia in the presence of a copper oxide-containing catalyst is described in U.S. Pat. No. 4,101,634 where it is also indicated that the conversion of nitrogen oxides with the simultaneous removal of sulfur oxides by means of a copper-containing acceptor proves not to exceed 70 percent.

In U.S. Pat. No. 4,101,634 sulfur oxides and nitrogen oxides are removed simultaneously by use of a metal-containing acceptor with continuous addition of ammonia or precursor thereof with some improvement in efficiency when the metal-containing acceptor is regenerated at regular intervals by a reducing gas passed counter-currently in the bed; the regeneration is terminated at the moment when at least some of the acceptor is still in the sulfate form; and the oxygen-containing gas stream to be purified is then re-contacted with the acceptor with the simultaneous addition of ammonia or precursor.

In U.S. Pat. No. 4,164,546, nitrogen oxides are removed from a gaseous mixture containing nitrogen oxides and oxygen by addition of ammonia thereto and by contacting with a suitable catalyst for the nitrogen-ammonia reaction wherein best results are achieved when sulfur dioxide is also present in the gaseous mixture and wherein excess sulfur dioxide is separated prior to the nitrogen oxide conversion, simultaneously therewith or subsequent thereto. In U.S. Pat. No. 4,164,546, fixed beds of the contact mass, such as copper oxide on alumina are preferred for effective removal of both sulfur dioxide and nitrogen oxide with regeneration by a reducing gas such as hydrogen, methane, ethane, propane and the like. Further, in U.S. Pat. No. 4,164,546, it is indicated that the flue gas may contain small amounts of finely-divided suspended particulate matter such as fly ash.

In U.S. Pat. No. 4,193,972, sulfur dioxides are removed from a gas stream by the use of a metal-containing regenerable acceptor and nitrogen oxides contained in the gas stream are reduced to nitrogen gas in a parallel passage vapor-solids contactor which is conventional for processing gas streams containing particulate matter, such as fly ash, and wherein the reduction of nitrogen oxides to nitrogen is catalyzed by copper sulfate on alumina. In U.S. Pat. No. 4,193,972, the reduction of nitrogen oxides to nitrogen may be carried out simultaneously with the acceptance of sulfur oxides on copper-containing acceptors, and the reaction may be preceded by the admixture of ammonia into the gas stream being treated.

Although regenerative processes wherein spent or loaded solid acceptor used to absorb sulfur dioxide from gas streams is regenerated in processes and systems for the simultaneous removal of sulfur dioxide, $NO_x$ and particulate matter from gas streams are well-known, the processes and systems remain disadvantageous because they are inefficient, require high capital investment when utilized in large scale systems and are expensive to operate in large plants, such as power plants which utilize combustible coal or fuel oil. Even though a certain amount of waste has been eliminated by the foregoing prior art regenerative processes, none of the emerging processes and systems discussed above have gained a wide industrial acceptance due to their high cost and complexity.

SUMMARY OF THE INVENTION

In view of the fact that pollution of our environment with gaseous mixtures containing particulate matter and the oxides of sulfur and nitrogen remains a problem, it is desirable to improve the efficiency of the removal of particulate matter and the oxides of sulfur and nitrogen from gas streams and to reduce capital cost of and expense of operating large scale systems dedicated to providing clean air. Accordingly, it is desirable to provide a regenerative process and system for the efficient and simultaneous removal of particulate matter and the oxides of sulfur and nitrogen from gases containing these pollutants.

Generally, the present invention is defined by a system and process in which particulate matter, sulfur oxides and nitrogen oxides are removed simultaneously by use of a metal-containing acceptor, with continuous addition of ammonia, or precursor thereof, and the sulfur oxide acceptor is regenerated continuously or at regular intervals (intermittently) by a reducing gas or by thermal decomposition, without the disadvantages of the prior art. In one aspect, the process is characterized in that the regeneration of the loaded sulfur oxide acceptor is effected by passing reducing gas through a fluidized loaded sulfur oxide acceptor bed to form regenerated acceptor. The gas stream to be purified is then contacted with the regenerated acceptor in an entrained bed with the addition of ammonia or ammonia precursor.

In accordance with the present invention, a highly efficient process and system for the simultaneous removal of particulate matter and the oxides of sulfur and nitrogen has been achieved by using a finely-divided solid acceptor for the oxides of sulfur on a suitable porous carrier, and by simultaneously using ammonia gas or a precursor thereof for the oxide of nitrogen, followed by filtration. The solid acceptor for sulfur oxides on a suitable carrier must be used in a reactor wherein an entrained bed of the solid acceptor for sulfur oxides is formed, that is, a reactor capable of forming an entrained bed of the finely-divided solid sorbent for the oxides of sulfur in a gas stream, such as a combustion exhaust gas stream. When a finely-divided solid sorbent on a suitable porous carrier is utilized, it is highly reactive and requires a very short contact time to absorb the oxides of sulfur and to reduce the oxides of nitrogen in the presence of ammonia gas when used in the reactor capable of forming an entrained bed of the finely-divided sorbent in the gas stream. The process and system of the present invention is highly efficient when the finely-divided solid acceptor for sulfur oxides is incorporated in and/or dispersed on a porous carrier material having a particle size up to about 200 microns and in certain embodiments a particle size of about 20 to about 200 microns. It is the critical combination of using the finely-divided sorbent and the highly porous carrier material which imparts high efficiency to the capacity of the sorbent to remove sulfur oxides from a gas stream when the sorbent is merely entrained in a stream of the gas to form an entrained bed.

In one aspect of the present invention, there is provided a process for simultaneously removing from a gaseous mixture, oxides of sulfur by means of a solid sulfur oxide acceptor on a porous carrier, oxides of nitrogen by means of ammonia gas and particulate matter by means of filtration, by (a) filtering the gaseous mixture to remove particulate matter when particulate matter in the gaseous mixture is coarser than or about the same size as the solid sulfur oxide acceptor on a porous carrier, thereby forming a pre-filtered gaseous mixture; (b) forming an entrained bed of solid sulfur oxide acceptor in the gaseous mixture to deplete sulfur oxides in the gaseous mixture and thereby convert solid sulfur oxide acceptor to loaded or spent solid sulfur oxide acceptor, the solid sulfur oxide acceptor being dispersed on a porous carrier material wherein the porous carrier material has a particle size up to about 200 microns when the gaseous mixture is pre-filtered and a particle size of about 20 to about 200 microns when pre-filtering is omitted; (c) injecting ammonia gas or a precursor capable of forming ammonia gas into the gaseous mixture prior to, during or after the formation of the entrained bed of solid sulfur oxide acceptor in the gaseous mixture to form a gas depleted of nitrogen oxides; (d) filtering the gas depleted of sulfur oxides and nitrogen oxides and containing entrained loaded solid sulfur oxide acceptor and particulate matter, to separate a clean gas from filtration solids of loaded solid sulfur oxide acceptor and particulate matter, the particulate matter generally being present in (d) only if pre-filtering is omitted; and (e) passing the clean gas to exhaust in an exhaust gas stream, optionally using an air preheater in the exhaust gas stream. When the pre-filtering step is omitted and particulate matter is present in the filtration solids, the loaded or spent solid sulfur oxide acceptor is regenerated by (f) classifying by size the filtration solids of loaded solid sulfur oxide acceptor and particulate matter into relatively coarse particles of loaded solid sulfur oxide acceptor on a porous carrier material and into relatively fine particles of particulate matter, e.g., fly ash; (g) regenerating the solid sulfur oxide acceptor to form a sulfur dioxide-rich gas and regenerated solid sulfur oxide acceptor; and (h) recycling the regenerated solid sulfur oxide acceptor to form an entrained bed of solid sulfur oxide acceptor on a porous carrier in a gaseous mixture.

In one aspect of the process of the present invention the relatively fine particles of particulate matter from the classifier are carried in a stream of gas and filtered to separate a second clean gas from the relatively fine particles of particulate matter, and the clean gas is passed to exhaust in an exhaust gas stream. The relatively fine particles of particulate matter which consist primarily of fly ash, are waste and are sent to disposal. Optionally, the filtration solids can be heated by air in the classifier, which heated air is used as a stream of gas to carry the loaded solid sulfur oxide acceptor to the regenerator and/or the fine particles of particulate matter to a filter after which the heated air passes as the stream of exhaust gas through the optional air preheater and thereafter to the exhaust gas stream.

In another aspect of the present invention, there is provided a system for simultaneously removing particulate matter and oxides of sulfur and nitrogen from a gas, such as a combustion exhaust gas stream, by using (a) a reactor capable of forming an entrained bed of sorbent in a gas stream, the sorbent being a solid sulfur oxide acceptor dispersed on a porous carrier material wherein the porous carrier material has an average particle size up to about 200 microns when the reactor is preceded with a particulate matter removal device or an average particle size of about 20 to about 200 microns when the reactor is not preceded with a particulate matter removal device; (b) optionally, a particulate matter removal device upstream of the reactor to remove particulate matter from the gas stream; (c) means for providing the solid sorbent in the reactor to form the entrained bed therein; (d) means for injecting ammonia gas or a precursor capable of forming ammonia gas into the gas stream; (e) a filter to separate solid sorbent or a mixture of solid sorbent and particulate matter from the gas stream to provide a clean gas stream; (f) optionally, an air preheater in the clean gas stream; and (g) means for passing a gas stream from a gas source, in sequence, to the optional particulate matter removal device, to the reactor, to the filter, to the optional air preheater in the clean gas stream and thereafter to the clean gas stream exit.

In accordance with the present invention, there is also provided a regenerative system for simultaneously removing from a gas stream, such as a combustion exhaust gas stream, particulate matter by means of a filter, oxides of nitrogen by means of ammonia gas and sulfur oxides by means of a solid sorbent dispersed on a porous carrier, and for regenerating spent or loaded solid sorbent on a porous carrier, by using (a) a reactor capable of forming an entrained bed of sorbent in a gas stream, the sorbent being a solid sulfur oxide acceptor dispersed on a porous carrier material wherein the porous carrier material has an average particle size up to about 200 microns when the reactor is preceded with a particulate removal device or an average particle size of about 20 microns to about 200 microns when the reactor is not preceded with a particulate removal device; (b) optionally, a particulate removal device upstream of the reactor to remove particulate matter from the gas stream; (c) means for providing the solid sorbent in the reactor to form the entrained bed therein; (d) means for injecting ammonia gas or a precursor capable of forming ammonia gas in the gas stream; (e) a filter to separate solid sorbent or mixture of solid sorbent and particulate matter from the gas stream to provide a clean gas stream; (f) optionally, an air preheater in the clean gas stream; (g) a clean gas stream exit from the system; (h) means for passing a gas stream from a gas source, in sequence, to the optional particulate matter removal device, to the reactor, to the filter, to the optional air preheater in the clean gas stream and thereafter to the clean gas stream exit; (i) a classifier optionally required only when a mixture of solid sorbent and particulate matter are collected on filter (e), having means to separate the mixture of solid sorbent and particulate matter into relatively coarse solid sorbent and relatively fine particulate matter collected from filter (e); (j) means for removing the relatively fine particulate matter carried in a stream of gas from the classifier and means for passing the stream of gas from the classifier to the optional air preheater in the clean gas stream or to the clean gas stream exit after removal of the relatively fine particulate matter therefrom; (k) a regenerator for the solid sorbent from filter (e) or classifier (i), whereby a sulfur oxide-rich gas and regenerated solid sorbent on a porous carrier are formed; (l) means for passing the relatively coarse solid sorbent on a porous carrier from the classifier to the regenerator; and (m) means for passing the regenerated solid sorbent on a porous carrier from the regenerator to the reactor.

As used herein, the terms "sorbent", "acceptor", "solid sulfur oxide acceptor" and "solid sulfur dioxide acceptor" are interchangeable and define a solid substance which is capable of binding a gas or a gaseous compound either physically or chemically, and such sorbents may comprise a porous carrier on which one or more metals and/or metal compounds have been deposited, for example, copper and/or copper oxide supported on porous alumina. A loaded or spent sorbent is one which has absorbed and/or reacted with the oxides of sulfur and includes sorbent in which the absorption and/or reaction capacity is either totally or partially expended. Loaded or spent sulfur oxide acceptor may include unreacted acceptor or acceptor which still has absorption capacity, mixed with the loaded or spent acceptor, and as used herein, the terms "loaded" or "spent" sulfur oxide include such acceptor material. In accordance with the present invention, when the sorbent is entrained in a stream of gas which contains an oxide of sulfur, such as sulfur dioxide, the sorbent depletes sulfur dioxide in the gas.

As used herein, the terms "oxides of sulfur", "sulfur oxide" and "sulfur dioxide" mean sulfur dioxide and/or sulfur trioxide and such terms may be used interchangeably. The terms "nitrogen oxide", "oxides of nitrogen" and "$NO_x$", as used herein, mean nitric oxide and/or nitrogen dioxide and may be used interchangeably.

As used herein, the term "particulate matter" or "particulates" refers to the conventional particulate matter emitted from the combustion of coal, fuel oil and other fossil fuels and hydrocarbons as well-known in the art and include emissions from power plants, steel mills, waste treatment sites, and the like. Particulate matter usually contains ash, for example, fly ash, and/or other material.

As used herein, clean gas is gas which has been treated in the process or system of the present invention and is partially or totally depleted in particulate matter and the oxides of sulfur and nitrogen.

As used herein, entrained bed reactor is a vessel, duct or pipe carrying the mixture of sorbent entrained in the gas stream.

By the present invention, there is provided an efficient and cost effective regenerative process and system for the simultaneous removal of particulate matter and the oxides of sulfur and nitrogen from combustion exhaust gas streams.

Other advantages of the process and system of the present invention will be apparent from the accompanying drawings and the following detailed description of the invention.

DETAILED DESCRIPTION OF THE INVENTION

The process and system of the present invention can be used for the simultaneous removal of particulate matter and oxides of sulfur and nitrogen contained in a gas stream or mixture of gases. Typical gas streams containing particulate matter and the oxides of sulfur and nitrogen are well-known in the art, many examples of which are described in the references cited above.

The solid sorbent used in the process and system of the present invention is critical and must be a sorbent which is highly reactive so that it will require a very short contact time to absorb sulfur dioxide and to reduce nitrogen oxide in the presence of ammonia gas derived directly from ammonia gas or an ammonia gas precursor, examples of which are well-known in the art.

The solid sorbent must be used in conjunction with a porous support or carrier material, for example, porous alumina and/or porous silica. In accordance with the present invention, the solid sorbent must be coated on or otherwise associated with the surface or impregnated into the body or core, or both, of a porous support or carrier material, for example, a catalytic grade support wherein the porous support or carrier has a particle size up to about 200 microns, and in certain embodiments a particle size of about 20 microns to about 200 microns.

Typical sorbents on typical porous carriers are well-known in the art and are described, for example, in U.S. Pat. Nos. 3,501,897; 3,776,854; 3,816,597; 3,840,643; 4,001,376; 4,170,627; 4,192,855; 4,258,020; 4,609,537; 4,692,318; and Re. 29,771, all of which are incorporated by reference herein in their entirety. Typical methods of making sorbents on porous carrier materials, typical sorbents, typical additives or promoters which act in combination with the sorbent, typical porous carrier materials, typical surface areas and the like are described in the foregoing references.

In preferred embodiments of the present invention, the solid sulfur oxide acceptor or solid sorbent is copper, copper oxide or a mixture thereof coated on and/or impregnated in porous alumina powder, preferably porous activated or gamma alumina. The porosity of the sorbent is generally a function of the porosity of the support or carrier material, which in turn is a factor in reactivity wherein the solid sorbent requires only a very short contact time to absorb sulfur oxides and to reduce oxides of nitrogen in the presence of ammonia gas carried in a gas stream in which the solid sorbent on a porous carrier, is entrained. Thus, in accordance with the present invention, the sorbent is highly reactive to promote the use of a reactor capable of forming an entrained bed of sorbent in a gas stream, for example, a combustion exhaust gas stream, such as a flue gas stream from a power plant.

Porosity of the carrier or support material for the sulfur oxide sorbent of the present invention is critical and must be sufficient so that the resulting sorbent supported or carried thereby has sufficient reactivity to deplete sulfur oxides from a gas stream in an entrained bed reactor. Typically, the porous carrier or support material, for example, activated alumina, has a high surface area of from about 50 $m^2/gm$. to about 500 $m^2/gm$. Although porous alumina is the preferred support or carrier material, and activated or gamma-alumina are the most preferred support or carrier materials in accordance with the present invention, examples of other refractory inorganic oxides include silica, zirconia, boria, thoria, magnesia, titania, chromia and the like, or composites thereof. Naturally occurring materials, such as, for example porous clays and silicates such as fuller's earth, attapulgus clay, feldspar, halloysite, montmorillonite, kaolin, and diatomaceous earth, frequently referred to as siliceous earth, diatomaceous silicate, kieselguhr, and the like, and the naturally occurring material may or may not be activated prior to use by one or more treatments including drying, calcining, steaming and/or acid treatment. As indicated above, the carrier or support material must be of a porous nature, that is, have a high surface area, to promote high reactivity of the sorbent so that it can be used in an entrained bed reactor, and it must be capable of supporting or carrying the sulfur oxide acceptor or solid sorbent material.

The porosity of carrier bodies is well-known and described, for example, in U.S. Pat. No. 3,776,854 which is incorporated by reference herein in its entirety. Many carrier bodies are already porous, however porosity can be increased by adding pore-forming agents to the starting materials prior to forming the material into the desired shape and calcining the shaped material at a temperature, for example, above about 780° C.

The shape of the porous carrier or support material is not critical, however, because of the criticality of the small size of the porous carrier or support material, that is up to about 200 microns, or in certain embodiments, about 20 microns to about 200 microns, only fine particles or very small shaped particles (finely-divided particles) can be used as porous carrier or support material in accordance with the present invention.

Typical sulfur oxide acceptors or solid sorbents are described in the above-cited references, and include, for example, in addition to copper, copper oxide or a mixture thereof, an alkali metal compound, such as potassium oxide or sodium oxide, promoted with a vanadium compound, such as vanadium oxide or vanadium pentoxide, or any other metal or metal oxide which is capable of binding sulfur oxides as, for example, sulfate, and which can be regenerated, for example, by means of a reducing gas. Naturally, there must be no adverse reaction between the sorbent material and/or the porous carrier or support material, the ammonia gas, the ammonia gas precursor, or any other components used in the process and the system of the present invention.

Although any sorbent on a porous carrier, including any metal or metal oxide on a porous carrier, which is an acceptor for sulfur oxides and which is capable of binding or reacting with sulfur oxides, and which is capable of being regenerated, after it becomes spent, loaded or deactivated, for example, which may be regenerated by means of a reducing gas, or thermal energy, may be used in the process and system of the present invention, the process and system will be discussed herein with reference specifically to copper-containing sulfur oxide acceptors, for example, copper oxide acceptors, on porous, activated alumina.

The amount of sorbent on the porous carrier material and/or impregnated in the porous carrier material is not critical as long as there is a sufficient amount of the sorbent, for example, metal or metal oxide, to remove the oxides of sulfur from the gas stream while the sorbent on the porous carrier is entrained in the gas stream and while the sorbent on the porous substrate is being collected on the filter downstream of the reactor. When the sorbent is copper and/or copper oxide on a porous alumina support, the copper content of the sorbent can, partly depending on the specific surface area of the material used, vary within wide limits. As a rule it is from about 0.1 to about 15 percent by weight based on finished sorbent. Optimum results are obtained with sorbents which contain from about 4 to about 10 percent by weight of copper. As indicated above, the porous carrier material is preferably an activated alumina such as gamma-alumina, an alumina such as alpha-alumina, or a mixture of gamma- and alpha-alumina, although in principle all solids are eligible which are temperature resistant and are not corroded by sulfur oxides and nitrogen oxides under the prevailing conditions.

When copper oxide is the sorbent, the reactions which take place in the process and system of the present invention, with $SO_2$ and $NO_x$ in the presence of ammonia gas are well-known and clearly described in the prior art, for example, flue gas from a combustion source, which ordinarily contains sulfur dioxide, sulfur trioxide, the oxides of nitrogen, primarily nitric oxide (NO), and particulate matter, as well as oxygen, react with the copper oxide to absorb $SO_2$ as shown in equation (1) below.

$$2CuO + 2SO_2 + O_2 \rightarrow 2CuSO_4 \quad (1)$$

The copper sulfate formed in equation (1) is regenerated, for example, by a reducing gas such as methane, as shown in equation (2), and the copper which is formed during the reductive regeneration, is oxidized to copper oxide by oxygen derived from the flue gas and/or from air added to the process or system as shown in equation (3).

$$2CuSO_4 + CH_4 \rightarrow 2Cu + 2SO_2 + CO_2 + 2H_2O \quad (2)$$

$$2CU + O_2 \rightarrow 2CUO \quad (3)$$

Copper sulfate is also thermally decomposed at temperatures greater than about 600° C. as shown in equation (4).

$$CuSO_4 \xrightarrow{(>600C)} CuO + SO_2 + \tfrac{1}{2} O_2 \quad (4)$$

As well-known in the art, the sulfur dioxide produced during the regeneration step as shown in equations (2) and (4) results in a sulfur dioxide rich gas, containing, for example, about 10% to about 40% by volume sulfur dioxide in air, which in turn can be recovered and converted by known methods to elemental sulfur and/or sulfuric acid.

The oxides of nitrogen, such as nitric oxide, are reduced by ammonia gas as shown in equation (5) where copper oxide and/or copper sulfate act as catalyst to the nitric oxide reduction, and nitrogen gas and water are formed from the reduction.

$$6NO + 4NH_3 \xrightarrow{(CuO/CuSO_4)} 5N_2 + 6H_2O \quad (5)$$

Nitrogen gas and water are carried by the clean gas stream to exit the system.

Sorbents comprising copper and/or copper oxide preferably supported on porous alumina as a carrier are very suitable for the removal of sulfur oxides from gases under oxidative conditions at temperatures above 500° F., conditions which are normally found in exhaust gases. Under the conditions in which the sulfur dioxide is chemically bound by the sorbent, sulfur trioxide is also removed from the gases.

The amount of ammonia gas or ammonia gas precursor injected into the gas stream is not critical as long as there is a sufficient amount of ammonia gas in the gas stream to reduce and preferably completely deplete, the $NO_x$ content of the gas stream. For the reduction of nitrogen oxides in the gas stream, ammonia in a quantity of about 0.1 to 2.0 times the requisite stoichiometric quantity is supplied to the gas to be treated. In preferred embodiments, the ammonia gas used in the gas stream is from about a 0.1:1 to about a 1.1:1 mole ratio with the nitrogen oxides content of the gaseous mixture.

According to the process and system of the invention, substantial quantitative reduction of $NO_x$ can be achieved. Ammonia is generally not detected in the flue gases treated. Instead of gaseous ammonia it is also possible to add precursors of ammonia, such as an aqueous solution of ammonia, or a ammonium carbonate solution, urea, hydrazine, ethylene diamine or hexamethylene diamine.

For the process and system of the present invention to be economical, it is necessary that the sorbent on a porous carrier be capable of regeneration a substantial number of times without loss of activity and stability, for example, a sorbent should be capable of regeneration many times with only 1 percent (by weight) or less addition of fresh sorbent on a porous carrier to make-up for losses and/or reduced activity.

The regenerator may be any conventional type of reactor, including fixed bed, moving bed, fluidized bed and the like. In accordance with the present invention, the fluidized bed type of regenerator is preferred wherein the hot regenerating gas or gases or hot air and the like are injected into a fluidized bed. The regeneration under reducing conditions typically takes place at a temperature as low as about 600° F. to about 1200° F., however, in certain preferred embodiments, the regeneration may take place in heated air at temperatures over about 1200° F., and more preferably, about 1200° F. to about 1800° F.

The regeneration of sorbents of the present invention, may be achieved by any of the systems and processes known in the art. Conventional reducing gases, such as methane, ethane, propane and the like, may be used, or a reducing gas, such as hydrogen, carbon monoxide or a hydrogen-containing gas diluted with steam, may be used. Hydrocarbon-containing gases, such as the off-gas from a catalytic reformer, are also suitable for the regeneration of sulfur oxide loaded metal-containing catalysts. Suitable hydrogen- and CO- containing gases may be obtained by partial oxidation or steam-reforming of hydrocarbons and from coal gasifiers.

The gas stream or mixture of gases which may be treated in the process and system of the present invention may be derived from any suitable source, such as exhaust gases, and more specifically, from a combustion exhaust gas stream, which contains particulate matter, oxides of nitrogen and sulfur oxides.

Although the compositions of gas streams and mixtures of gases vary widely, depending on the particular source of the gas stream, typically such exhaust gases contain between 500 and 10,000 ppmv $SO_2$ and between about 100 and 2,000 ppmv nitrogen oxide, calculated as NO. In addition to $SO_2$ and nitrogen oxides, the exhaust gases contain nitrogen, water vapor and $CO_2$ as well as residual oxygen.

Figure 1:
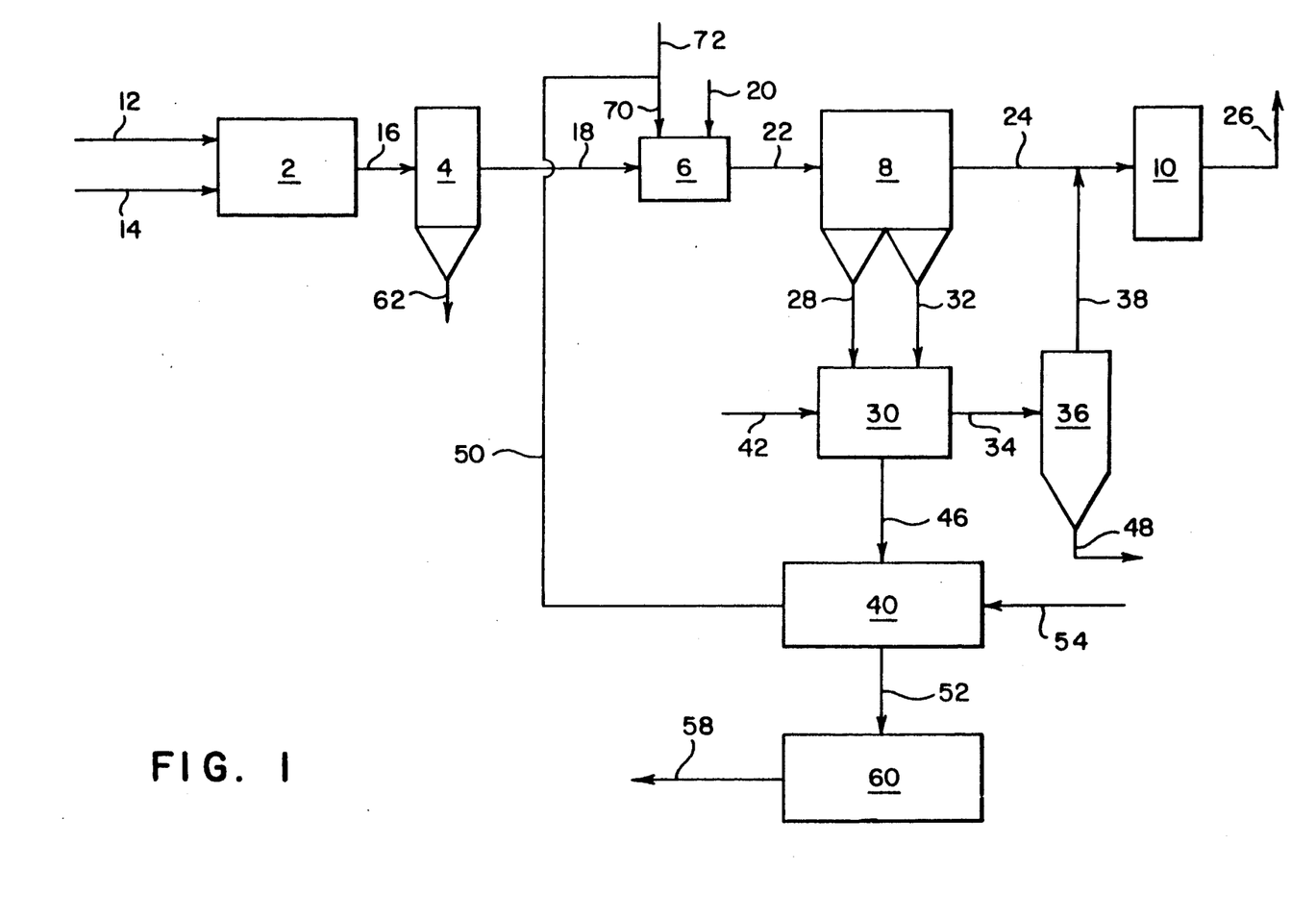
FIG. 1 represents a diagrammatic representation of the system of the present invention.

As shown in FIG. 1, an exhaust gas source is derived, for example, from boiler 2 which is fed by a stream of coal 12 and air 14. A stream of combustion exhaust gas containing particulate matter, such as fly ash and the oxides of sulfur and nitrogen, flows in duct 16 at a temperature of about 600° F. to about 900° F. into a particulate removal device 4, for example, a cyclone, to remove coarse fly ash from the exhaust gas stream in duct 16. The fly ash collected from the gas stream in mechanical particulate removal device 4 is removed therefrom by a suitable outlet 62, and fly ash and other particulate matter collected in particulate removal device 4 is discharged as appropriate, for example, to waste.

Generally, the average particle size of particulate matter, such as fly ash, derived from the combustion of coal, hydrocarbon fuel and the like, has an average particle size of less than 20 microns, defined herein as relatively fine particles of particulate matter. When the particulate matter in the combustion exhaust gas stream in duct 16 has a particle size less than about 20 microns, then particulate removal device (cyclone) 4 is optional and can be by-passed, or alternatively, can be omitted from the system. Thus, it is only when the particulate matter in the combustion exhaust gas stream has a particle size of about 20 microns or greater, that is, when the particulate matter in the combustion exhaust gas stream is coarser than or about the same size as the sorbent, that is, solid sulfur oxide acceptor on a porous carrier, that particulate matter must be removed from the exhaust gas stream in particulate removal device 4, otherwise designated herein as a pre-filtering device 4.

As indicated above, pre-filtering device 4 is only necessary when the particulate matter, such as fly ash, in the combustion exhaust gas stream fed to the system is of a particle size which is substantially the same as or coarser than the sorbent used to remove the oxides of sulfur from the combustion exhaust gas stream. If the particulate matter in the combustion exhaust gas stream is less than about 20 microns, it can be separated from a sorbent, having a particle size of about 20 microns to about 200 microns, in a classifier located downstream of the entrained bed reactor and a particulate matter filter, wherein the classifier separates the mixture of solid sorbent having a particle size of about 20 microns to about 200 microns and particulate matter having a particle size of less than 20 microns into relatively coarse solid sorbent which would include relatively coarse particulate matter, such as fly ash, if present, and into relatively fine particulate matter, which is primarily particulate matter, such as fly ash, having a particle size less than 20 microns.

From the foregoing, it is also clear that if particulate matter in the combustion exhaust gas stream is removed by the optional particulate removal device or pre-filtering device 4, the particle size of the finely-divided sorbent can also include particle sizes less than 20 microns, and thus include particles having a size up to about 200 microns when the particulate matter is removed from the combustion exhaust gas stream flowing through duct 16. The combustion exhaust gas stream pre-filtered in pre-filtering device 4 passes by any suitable means from pre-filtering device 4 to reactor 6, or alternatively, if there is no pre-filtering device 4, or if pre-filtering device 4 is by-passed, directly from duct 16 to reactor 6.

Reactor 6 is any suitable device wherein a solid material can be entrained in a gas stream flowing through the device. In its simplest form in accordance with the present invention, reactor 6 is merely a duct identical to or similar to ducts 16 and/or 18. It can also be a conduit, a vessel and the like, including any other device or apparatus wherein solids can be injected or passed into a stream of gas passing therethrough and wherein the solids become entrained in the gas stream. The formation of the entrained bed is dependent upon the velocity of the gas stream, for example, a combustion exhaust gas stream, flowing through reactor 6. A simple injector port, pipe or vent 70 can be used to inject solids into the combustion exhaust gas stream in reactor 6 so that they will become entrained therein.

In reactor 6, an entrained bed of sorbent wherein the sorbent is a solid sulfur oxide acceptor dispersed on a finely-divided porous carrier material and wherein the finely-divided porous carrier material has an average particle size up to about 200 microns when the reactor is preceded with particulate removal device 4 and an average particle size of about 20 microns to about 200 microns when the reactor is not preceded with particulate removal device 4, is formed as explained above. Fresh or make-up sorbent is added to reactor 6 at inlet 72 and 70 where the solid sorbent becomes entrained in the gas stream entering reactor 6 through duct 18, and as explained above.

The gas stream entering reactor 6 must have a velocity which will entrain the solid sorbent injected therein, and accordingly, the velocity of the gas may be any velocity sufficient to form an entrained bed of solid sorbent therein and propel the solid sorbent to a suitable filtering device. The velocity of combustion exhaust gas streams from power plants, diesel engines and other common sources is generally sufficient to form the entrained bed of sorbent in the combustion exhaust gas stream without further assistance.

When the regenerative system is in operation, solid sorbent injected into reactor 6 is primarily derived from regenerated solid sorbent from a regenerator through a suitable conduit 50. This is discussed in more detail below.

Ammonia gas or a precursor capable of forming ammonia gas is also injected into the exhaust gas stream. In FIG. 1, ammonia gas injector 20 provides ammonia gas in the combustion exhaust gas stream in reactor 6 where the ammonia gas is also entrained in the combustion exhaust gas stream. In alternative embodiments (not shown) ammonia gas or a precursor capable of forming ammonia gas can be injected into the combustion exhaust gas stream prior to reactor 6, for example, in duct 18 or subsequent to reactor 6, for example, in duct 22. In accordance with the present invention, the particular part of the system in which the ammonia gas or precursor is injected therein, is not critical and can be easily chosen by one skilled in the art.

As the sorbent and ammonia gas become entrained in the combustion exhaust gas stream and travel therewith through reactor 6 and thereafter through duct 22, the ammonia reacts with the $NO_x$ to produce elemental nitrogen and water, and the sulfur oxides react with and/or are absorbed on the sorbent. When the sorbent is copper oxide, the reaction shown above takes place and copper sulfate is formed in the gas stream.

The entrained bed passes through duct 22 into filter 8 where the solid sorbent having reacted and absorbed oxides of sulfur thereon or a mixture of solid sorbent having oxides of sulfur reacted and absorbed thereon and particulate matter, if present, are separated from the combustion exhaust gas stream to form a clean gas which exits filter 8 by means of a suitable duct 24. In preferred embodiments, filter 8 is a high temperature filter suitable for filtering the hot gas, for example, a ceramic or fiber metal filter In filter 8, any solids which are filtered from the gas stream, also form a filter cake of sorbent which generally contains partially depleted or in certain cases, amounts of filtered reactive sorbent, and the removal of the oxides of sulfur and nitrogen continues in the filter cake in filter 8, thereby assisting in the removal of the oxides of sulfur and nitrogen from the gas stream. In certain embodiments, the entrained bed reactor residence time may be very short and most of the removal of $SO_2$ and $NO_x$ will occur in the filter cake in filter 8.

Clean gas leaving filter 8 in duct 24 proceeds to a clean gas stream exit 26 from the system, for example, an exhaust gas stack. In certain embodiments, an optional air preheater 10 may be placed in the clean gas stream so that clean gas from duct 24 passes through the air preheater 10 before it flows to clean gas stream exit 26. Air preheater 10 may be any conventional heat exchanger which extracts heat from clean gas passing therethrough. Air preheater 10 extracts heat from the combustion exhaust gas stream and provides heat for the air that goes to the boiler, for example, air preheater 10 heats the air provided in stream 14.

Filter 8 removes only spent sorbent when pre-filtering device 4 is used to remove all particulate matter from the combustion exhaust gas stream. If pre-filtering device 4, for example a cyclone, removes only relatively coarse particles of particulate matter from the combustion exhaust gas stream, then relatively fine particulate matter may be entrained in the combustion exhaust gas stream in duct 18 which enters reactor 6 and is filtered by filter 8 Further, if pre-filtering device 4 is omitted from the system, or if it is bypassed, then filter 8 removes spent sorbent and particulate matter from the combustion exhaust gas stream where it is collected as filtration solids and may be removed by means of hoppers in conduits 28 and 32.

If a mixture of spent sorbent and particulate matter are collected by filter 8, then the mixture passes through conduits 28 and 32 to classifier 30 where the mixture is separated into relatively coarse but finely-divided solid sorbent and relatively fine particulate matter. As used herein, the solid sorbent is considered finely-divided even though it is the relatively coarse fraction separated from classifier 30.

Classifiers are well-known and well-defined in the art for classifying particles by size from a flue gas stream to produce a quantity of relatively coarse particles and a quantity of relatively fine particles. An example of classification is found in U.S. Pat. No. 4,193,972 which is incorporated by reference herein in its entirety. Generally, in the classifier in accordance with the present invention, the relatively coarse particles are those having an average particle size of about 20 microns and larger and relatively fine particles are those having a particle size of less than about 20 microns. Any device well-known in the art which is capable of separating relatively coarse particles from relatively fine particles may be used to classify and separate the relatively coarse particles of finely-divided spent sorbent from the relatively fine particles of particulate matter in accordance with the present invention.

The classifier can also serve as a sorbent heater by using a stream of hot air 42 as a carrier gas to conduct the classified solids, that is, the relatively coarse finely-divided spent sorbent and/or the relatively fine particulate matter in transporting the foregoing from classifier 30. The relatively fine particulate matter is primarily particles of fly ash and is removed from classifier 30 by stream 34 (suitable duct) to filter 36 where the particulate matter can be separated from the carrier gas stream, and the carrier gas stream can be discharged to exhaust by conduit 38 which can be fed to the air preheater 10 in clean gas stream 24 and thereafter to clean gas stream 26. The particulate matter filtered by filter 36, for example, a baghouse, can be removed through conduit 48 and discharged to waste.

The finely-divided spent or loaded sorbent from classifier 30 or the finely-divided spent or loaded sorbent from filter 8 when particulate matter has been pre-filtered by particulate removal device or pre-filtering device 4, passes by suitable conduit 46 to regenerator 40. Thus, when only spent sorbent is present in filter 8, spent sorbent removed by means of suitable conduits 28 and 32 can flow directly into regenerator 40 and bypass classifier 30, or classifier 30 can be omitted from the system.

The spent or loaded sorbent in regenerator 40 is regenerated to form a gas which is rich in sulfur oxides. The gas which is rich in sulfur oxides, for example, a sulfur dioxide-rich gas passes by suitable conduit 52 to sulfur oxide recovery unit 60 where sulfur oxides, for example, sulfur dioxide can be converted into elemental sulfur and/or sulfuric acid which passes from sulfur oxide recovery unit 60 via suitable conduit 58 for recovery. Generally, in accordance with the present invention, the sulfur dioxide rich gas which passes through conduit 52 from regenerator 40 to sulfur oxide recovery unit 60 has a sulfur dioxide content of about 10 percent to about 40 percent by volume.

The finely-divided spent or loaded sorbent, for example spent or loaded copper oxide/copper sulfate-coated porous alumina powder generally has a small copper oxide to copper sulfate ratio due to the reactivity of the sorbent. The spent sorbent is regenerated in regenerator 40 by any conventional method, for example, by using a reducing gas, such as natural gas, methane, ethane, propane and the like as well-known in the prior art and which is shown as entering regenerator 40 by means of stream 54 or by thermal decomposition using hot air at a temperature greater than about 1200° F. and preferably at a temperature of about 1200° F. to about 1800° F. The regenerated sorbent is reinjected into reactor 6 through stream 50 where it becomes entrained in the combustion exhaust gas stream from duct 18.

The foregoing system may be easily adapted for the simultaneous control of the oxides of sulfur, the oxides of nitrogen and particulate matter found in the combustion gases of power plants, diesel engines and industrial boilers and the like.

The following specific examples describe the process and system of the present invention. They are intended for illustrative purposes only and should not be construed as limiting the present invention.

A typical sorbent was made by soaking activated alumina powder having an average particle size of about 20 to about 100 microns in diameter, in a water-soluble copper salt such as copper nitrate or copper sulfate. The soaking is following by drying and calcining of the powder. The impregnated powder is highly reactive.

In laboratory fixed bed tests a greater than 99 percent removal efficiency was consistently achieved using a 1 mm to 5 mm thick cake of powder which was allowed to settle on a high temperature fiber metal filter element, containing about 5.2 percent by weight copper. The inlet concentration of sulfur dioxide was 310 ppmv with temperatures in the range of about 500° F. to about 800° F. and a gas velocity in the range of 4.3 ft. per minute to about 15 ft. per minute. Typical test results for the foregoing tests on the filter cake are shown in FIG. 2 where the gas velocity was 4.3 ft. per minute, 7.5 ft. per minute and 10 ft. per minute and the cake thickness was 1 mm.

Figure 2:
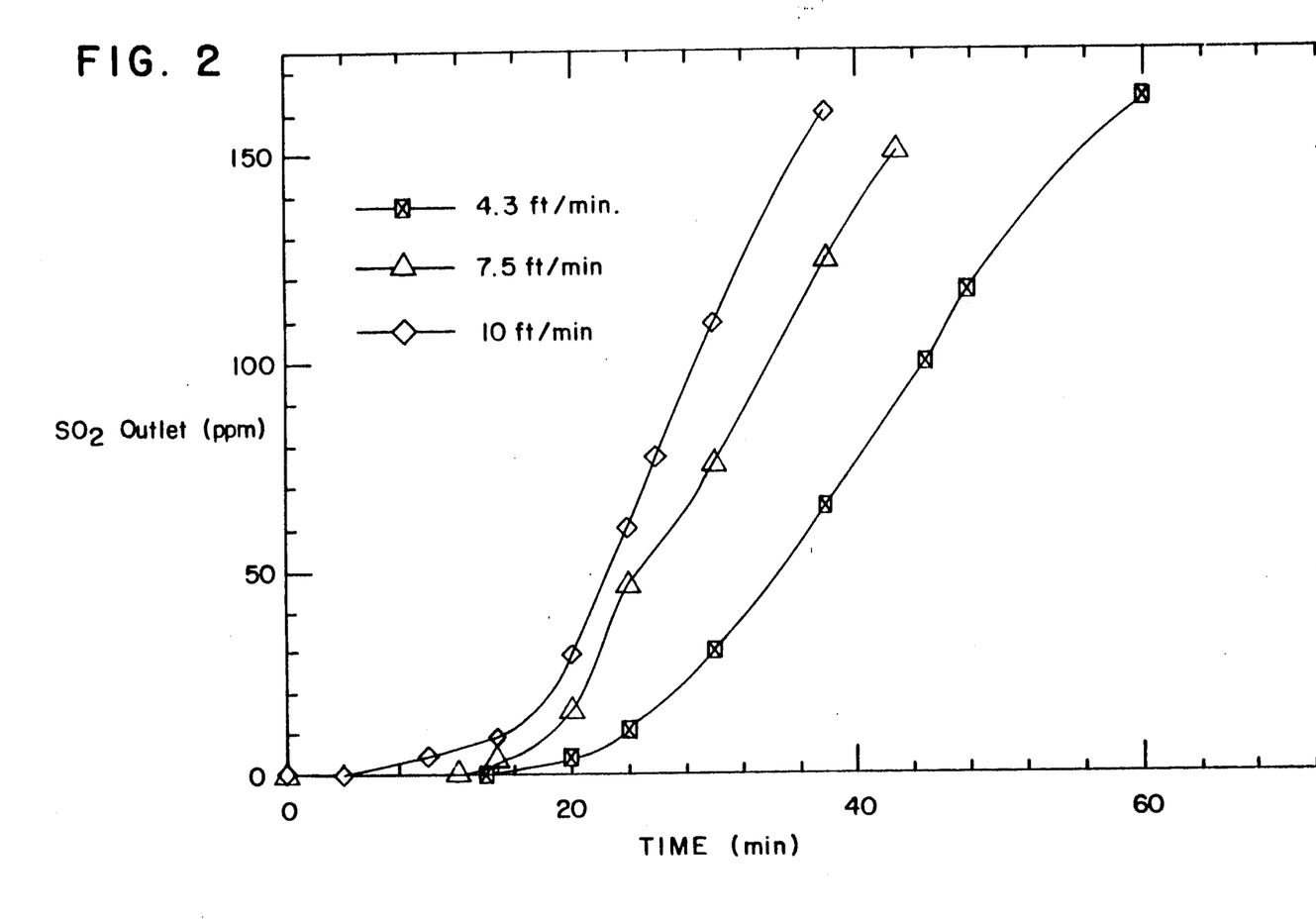
FIG. 2 is a graph showing sulfur dioxide emission versus time for a copper oxide/alumina sorbent through which sulfur dioxide-containing gas was passed at three different velocities at a temperature of 700° F.

The fixed bed test shown in FIG. 2 illustrates that the existence of copper oxide on a finely-divided (small in diameter), porous alumina powder increases the reactivity and utilization of the copper oxide and that only a short contact time is needed for reaction to occur between the copper oxide-coated powder and ammonia gas injected into the mixture of oxides of sulfur and oxides of nitrogen in a gas stream.

The process of the present invention takes advantage of a short contact time by using the finely-divided copper oxide-coated porous alumina powder in a relatively high velocity gas stream containing the oxides of sulfur, oxides of nitrogen and particulate matter typical of the effluent gases from power plants, diesel motors and the like. The use of an entrained bed of copper oxide-coated, finely-divided porous alumina powder in average particle sizes up to 200 microns, and in certain embodiments from about 20 microns to about 200 microns, in an entrained bed reactor, for example, in a flue gas duct, eliminates the use of large reactor vessels that are conventionally used for the simultaneous removal of oxides of sulfur, oxides of nitrogen and particulate matter.

In another experimental system built to remove oxides of sulfur, oxides of nitrogen and particulate matter from the exhaust gas of a diesel engine, the system included injector means to inject copper oxide coated, finely-divided porous alumina particles having an average particle size of about 20 to about 100 microns in diameter, into the exhaust pipe of the diesel engine, as well as an injector to inject ammonia gas into the exhaust pipe. A filter was located downstream of the exhaust pipe to capture particulate matter in the combustion gas as well as the injected finely-divided copper oxide coated alumina particles. Collected particles on the filter downstream of the exhaust pipe were removed from the filter elements by a reverse pulse jet as well-known in the art. The reverse pulse jets were staggered so that about ⅓ of the filter media downstream of the exhaust pipe was cleaned with each pulse. The filter media was made of fiber metal and was built to operate at temperatures up to about 1000° F. The filter elements in the filter were candle filters with a total of 7.5 sq. ft. of filter medium. Combustion gas velocity through the filter medium was 8.0 ft./min. Conventional detectors were used to measure the inlet concentration of sulfur dioxide and of nitrogen and the outlet concentration of sulfur dioxide and oxides of nitrogen.

The foregoing system operated at the diesel engine exhaust gas temperature of about 700° to about 800° F. and a gas flow rate of 60 acfm (air-to-cloth ratio of 8 ft./min).

Figure 3:
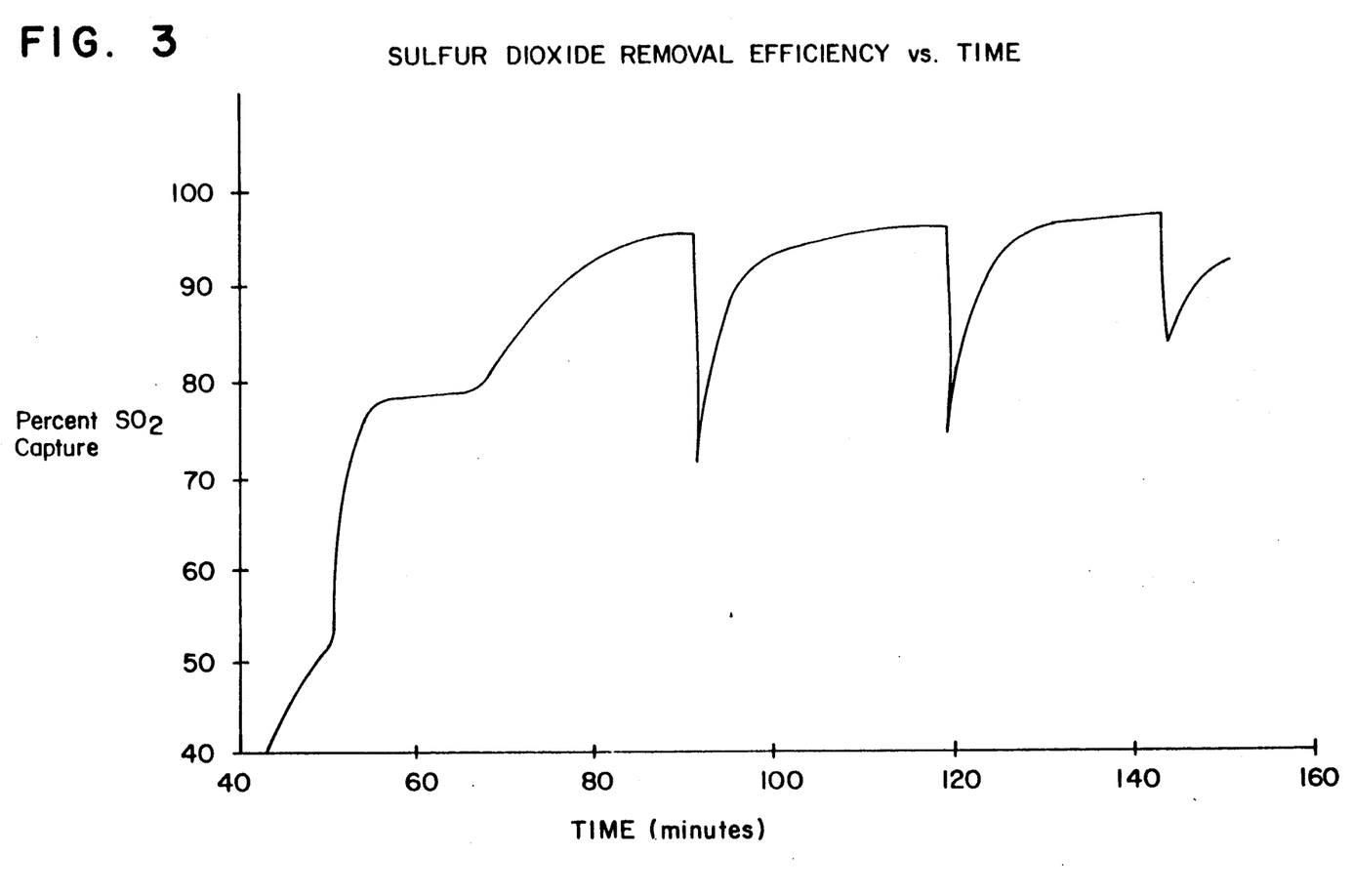
FIG. 3 is a graph showing sulfur dioxide removal efficiency versus time for a copper oxide/alumina sorbent used to treat a combustion gas from a diesel engine, the gas containing 210 ppm sulfur dioxide.

FIG. 3 shows the sulfur dioxide removal efficiency as a function of engine running time. The exhaust gas from the diesel engine contained about 210 ppmv sulfur dioxide prior to treatment and after the diesel engine had been running for about 40 minutes, sorbent injection into the exhaust gas stream was initiated. The increased sulfur dioxide removal efficiency with time, as illustrated in FIG. 3, was due to an increase in the rate of sorbent injection and to the accumulation of sorbent on the filter elements. Removal efficiency of 95 percent was achieved at about 90 minutes into the run. At about 90 minutes into the run, filter cake was removed from ⅓ of the elements by reversed air pulse jet which resulted in a short duration drop in sulfur dioxide removal efficiency to 70 percent. Efficiency increased in a short duration to about 90 percent to 95 percent after the cleaning. Cleaning cycles, that is, cleaning of the filter cake from ⅓ of the filter elements by reverse air pulse jet, were activated at 120 minutes and 145 minutes into the run resulting in short duration efficiency drops to 75 percent and 85 percent respectively as shown in FIG. 3.

Simultaneously with the injection of finely-divided copper oxide-coated porous alumina particles into the exhaust gas of the diesel engine, ammonia gas was injected into the exhaust gas duct. The inlet concentration of the oxides of nitrogen, that is the concentration of the oxides of nitrogen prior to treatment with ammonia gas, was about 600 ppmv. At an ammonia gas/nitrogen oxide ratio of 0.91, a nitrogen oxide ($NO_x$) reduction of up to 87 percent was observed. In view of the fact that 10 percent of the $NO_x$ is at an oxidation state higher than NO, the ammonia slip is believed to be negligible.

The foregoing test shows that a removal efficiency of sulfur dioxide greater than 95 percent can be achieved in a system and process using an entrained bed of finely-divided copper oxide-coated porous alumina particles having a particle size of about 20 to about 100 microns used in conjunction with a filter. Higher removal efficiency can be achieved with an increase in CuO to $SO_2$ ratio by increasing the sorbent injection rate and/or by increasing the sorbent residence time in the entrained bed reactor.

While other modifications of the invention and variations thereof which may be employed within the scope of the invention, have not been described, the invention is intended to include such modifications as may be embraced within the following claims.

What is claimed is:

1. A process for simultaneously removing from a gaseous mixture, sulfur oxides by means of a solid sulfur oxide acceptor on a porous carrier, nitrogen oxides by means of ammonia gas and particulate matter by means of filtration and for regenerating loaded solid sulfur oxide acceptor, the method comprising:

(a) optionally, filtering the gaseous mixture to remove particulate matter when particulate matter in the gaseous mixture is coarser than or about the same size as the solid sulfur oxide acceptor;

(b) forming an entrained bed of solid sulfur oxide acceptor in the gaseous mixture to deplete sulfur oxides in the gaseous mixture and thereby convert solid sulfur oxide acceptor to loaded solid sulfur oxide acceptor, the solid sulfur oxide acceptor being dispersed on a finely-divided porous carrier material wherein the porous carrier material has a particle size up to about 200 microns when the gaseous mixture is filtered in step (a) or a particle size of about 20 microns to about 200 microns when filtering of the gaseous mixture in step (a) is omitted;

(c) injecting ammonia gas or a precursor capable of forming ammonia gas into the gaseous mixture prior to, during or after the formation of the entrained bed of solid sulfur oxide acceptor in the gaseous mixture to form a gas depleted of nitrogen oxides;

(d) filtering the gas depleted of sulfur oxides and nitrogen oxides and containing entrained loaded solid sulfur oxide acceptor and any particulate matter, to separate a clean gas from filtration solids comprising loaded solid sulfur oxide acceptor on a porous carrier material and particulate matter, the particulate matter being present if filtering step (a) is omitted;

(e) passing the clean gas to exhaust in an exhaust gas stream, optionally using an air preheater in the exhaust gas stream;

(f) optionally, classifying by size the filtration solids comprising both loaded solid sulfur oxide acceptor and particulate matter into relatively coarse particles of loaded solid sulfur oxide acceptor on a porous carrier material and into relatively fine particles of particulate matter when particulate matter is present in the filtration solids;

(g) regenerating the loaded solid sulfur oxide acceptor on a porous carrier material from step (d) or step (f) to form a sulfur dioxide-rich gas and regenerated solid sulfur oxide acceptor; and (h) recycling the regenerated solid sulfur oxide acceptor on a finely-divided porous carrier to form the entrained bed of solid sulfur oxide acceptor on a finely-divided porous carrier in a gaseous mixture.

2. The process of claim 1 further comprising converting the sulfur dioxide-rich gas to elemental sulfur, sulfuric acid or concentrated sulfur dioxide gas.

3. The process of claim 1 wherein the gaseous mixture forming the entrained bed of solid sulfur oxide acceptor has a velocity of about 0.5 ft/sec. to about 20 ft/sec. to form the entrained bed of solid sulfur oxide acceptor therein.

4. The process of claim 1 wherein the solid sulfur oxide acceptor on a carrier is copper, copper oxide or mixture thereof coated on porous alumina powder.

5. The process of claim 4 wherein the copper, copper oxide or mixture thereof comprises about 0.1 to about 15 weight percent of the solid sulfur oxide acceptor.

6. The process of claim 1 wherein the ammonia is employed in from about a 0.1:1 to about 2.5:1 mole ratio with the nitrogen oxides content of the gaseous mixture.

7. The process of claim 1 wherein the exhaust gas stream is at a temperature of about 500° F. to about 1200° F. in the air preheater.

8. The process of claim 1 wherein the loaded sulfur oxide acceptor is regenerated with heated air at a temperature of about 1200° F. to about 1800° F.

9. The process of claim 1 wherein the loaded sulfur oxide acceptor is regenerated with a heated reducing gas.

10. The process of claim 1 further comprising filtering the relatively fine particles of particulate matter of step (f) carried in a stream of gas to separate a second clean gas from the relatively fine particles of particulate matter and passing the clean gas to exhaust as in step (e).

* * * * *